July 7, 1959   O. CESAREO   2,894,071
NUMBER MATCHING CIRCUIT
Filed Jan. 16, 1957   9 Sheets-Sheet 1

INVENTOR
O. CESAREO
BY C. Mattice
ATTORNEY

INVENTOR
O. CESAREO
BY
C. Mattice
ATTORNEY

July 7, 1959        O. CESAREO        2,894,071
NUMBER MATCHING CIRCUIT

Filed Jan. 16, 1957        9 Sheets-Sheet 5

INVENTOR
O. CESAREO
BY C. Mattice
ATTORNEY

July 7, 1959   O. CESAREO   2,894,071
NUMBER MATCHING CIRCUIT
Filed Jan. 16, 1957   9 Sheets-Sheet 6

INVENTOR
O. CESAREO
BY C. Mattice
ATTORNEY

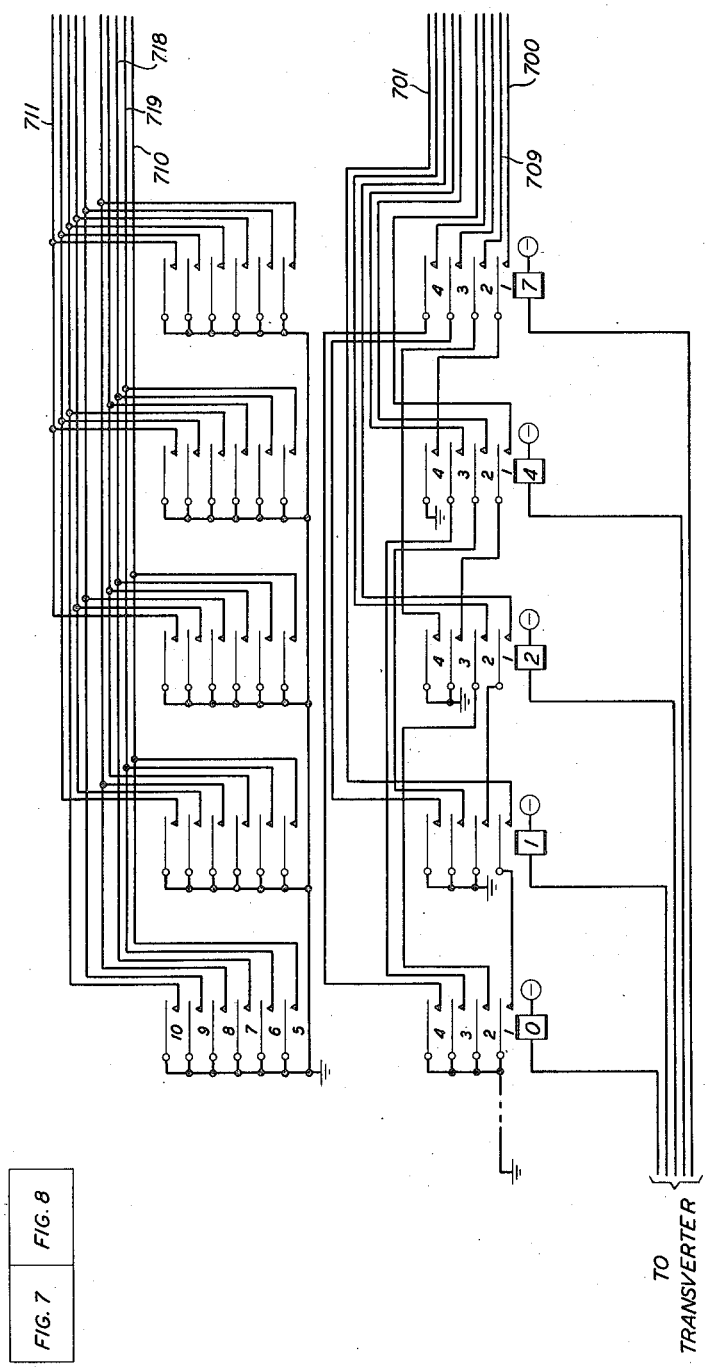

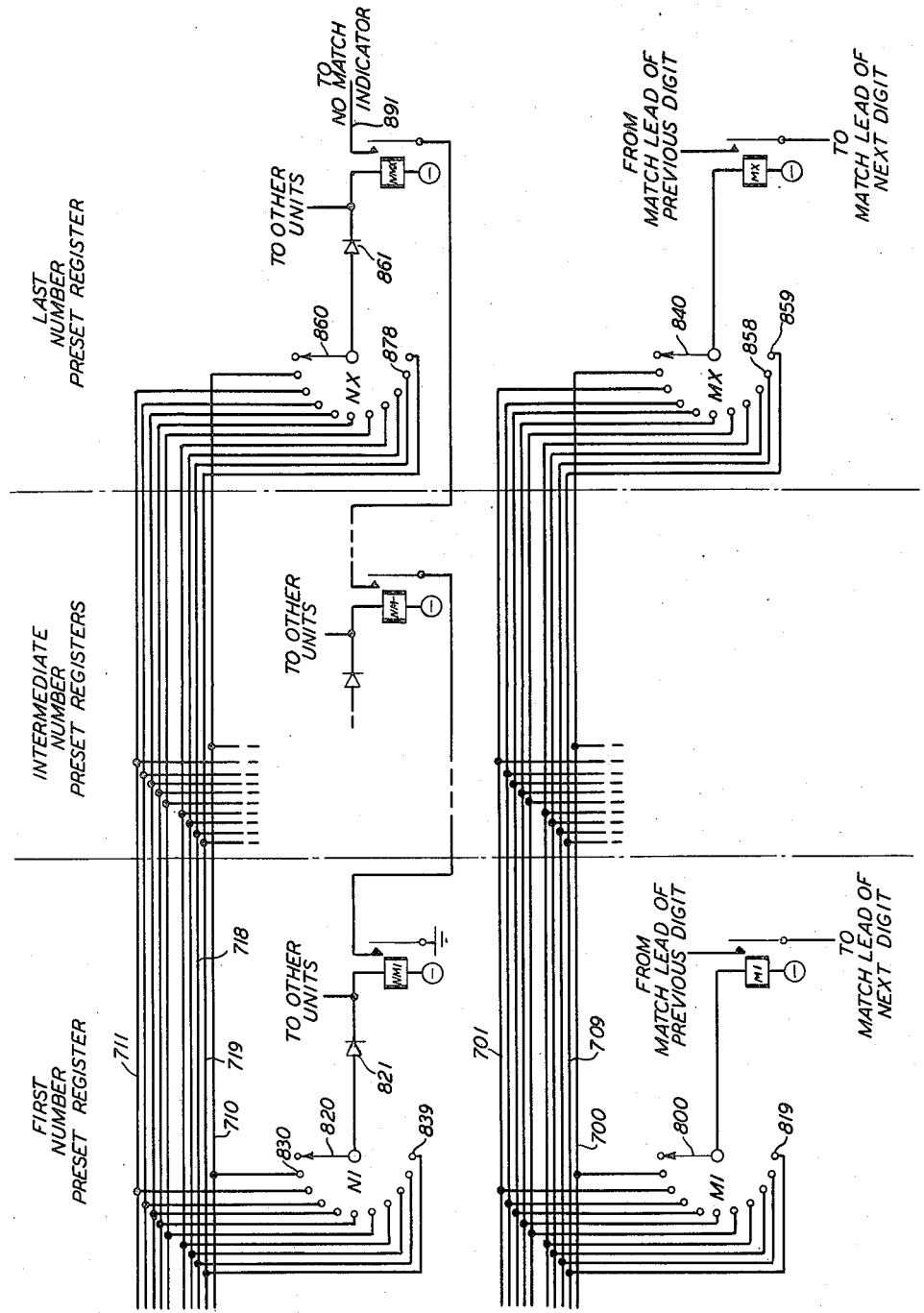

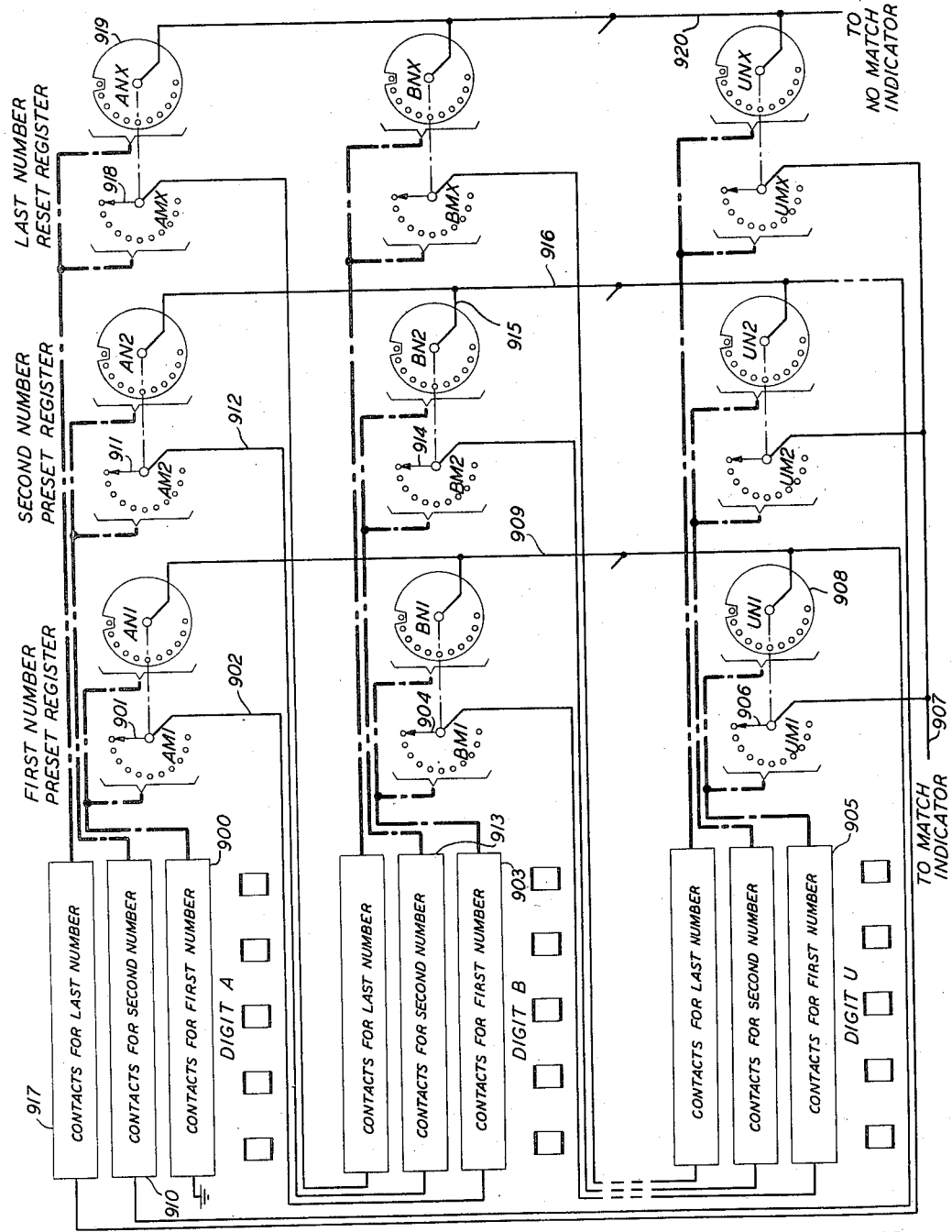

United States Patent Office

2,894,071
Patented July 7, 1959

2,894,071

NUMBER MATCHING CIRCUIT

Orfeo Cesareo, Washington Township, Bergen County, N.J., assignor to Bell Telephone Laboratories, Incorporated, New York, N.Y., a corporation of New York Application January 16, 1957, Serial No. 634,467

7 Claims. (Cl. 179—18)

This invention relates to a number matching arrangement in which any single random number may be matched against a plurality of predetermined numbers, with means for positively indicating either that the random number matches one of the predetermined numbers or does not match any of the predetermined numbers.

More specifically, the present invention constitutes an improvement on the number matching arrangement forming part of the disclosure of the application of Breed-Cesareo-Germanton-Roberts-Weber-Wingardner, Serial No. 463,102, filed October 19, 1954, which is directed to means for automatically recording information concerning telephone calls for charge purposes and more specifically to means for obtaining the information at a local office and making the records at a centralized or tandem office.

It is the present practice in telephone central offices to observe the functioning of the central office equipment in connection with the lines of subscribers, particularly of those who have complained about the service or about overcharges. This may be done by means made individual to the line, but, when local automatic message accounting is available, it is usually accomplished by causing a detailed initial entry to be made by the message accounting recorder for all calls from the line under observation. Where, as in the arrangement of the above-identified Breed et al. application, the calling line and the recorder are in different offices no simple means is available for instructing the recorder when a detailed initial entry is required for observation purposes. Accordingly, a matching circuit is provided in which are registered the directory numbers of the lines in the local offices for which service observed initial entries are desired. As each calling line number is received in the recording office, it is passed to the matching circuit and there compared with the numbers registered therein. If the calling line number matches any of the registered directory numbers, an indication is given which causes a detailed initial entry to be made for the call. If the calling line number does not match any of the registered directory numbers, no such indication is given and after a measured time interval, to allow for a delay in receiving the match indication, the initial entry normally required is made by the recorder.

It would be apparent that if a positive no-match indication could be given, the time measuring equipment would not be necessary and for many calls the operation of the recorder and its control equipment would be speeded up.

In accordance with the present invention, the line numbers to be observed are preset on a plurality of manually positioned registers while the received calling line numbers are set up one at a time on an auxiliary incoming register and means is provided whereby a match indicator is operated under the joint control of the auxiliary register and any one of the preset registers while a no-match indicator is operated under the joint control of the auxiliary register and all of said preset registers.

Since each telephone designation is made up of a number of digits, each preset register will comprise a plurality of units, one for each digit of a designation and the auxiliary register will also include a number of sub-registers. Each of the preset units has a set of terminals including one for each of the digit values from 0 to 9 and each register unit is set to mark the terminal representing the value of the corresponding digit of the designation to be observed. When the auxiliary register is set in accordance with the designation of a calling line, each sub-register marks a terminal in each of the register units belonging to the same designation digit. If each sub-register marks the same terminal as the corresponding register unit in one preset register, a match indicator is operated but if the subregisters mark at least one terminal in each of the preset registers which is not marked by the corresponding unit of the preset register, a no-match indicator is operated.

More specifically, each individual register unit comprises a two-layer switch, each layer having terminals corresponding to the ten digits 0 to 9. One layer has a brush which marks a single terminal and the other layer has a disc-shaped brush which makes contact with all terminals but the one marked in the first layer. The subregister marks the corresponding terminal in both layers so that a link is closed in either a match circuit or a no-match circuit for any setting of the auxiliary register.

These and other features of the invention will be more clearly understood from a consideration of the following description read in connection with the attached drawings in which:

Figs. 7 and 8 show a second embodiment of the invention, Fig. 7 showing an auxiliary subregister for a single digit and Fig. 8 showing the corresponding preset register units;

Fig. 9 shows an additional embodiment of the invention, the auxiliary registers being shown in schematic form;

Fig. 10 shows the manner in which Figs. 1 to 6 are to be arranged; and

Fig. 11 shows the manner in which Figs. 7 and 8 are to be arranged.

Figure 1:
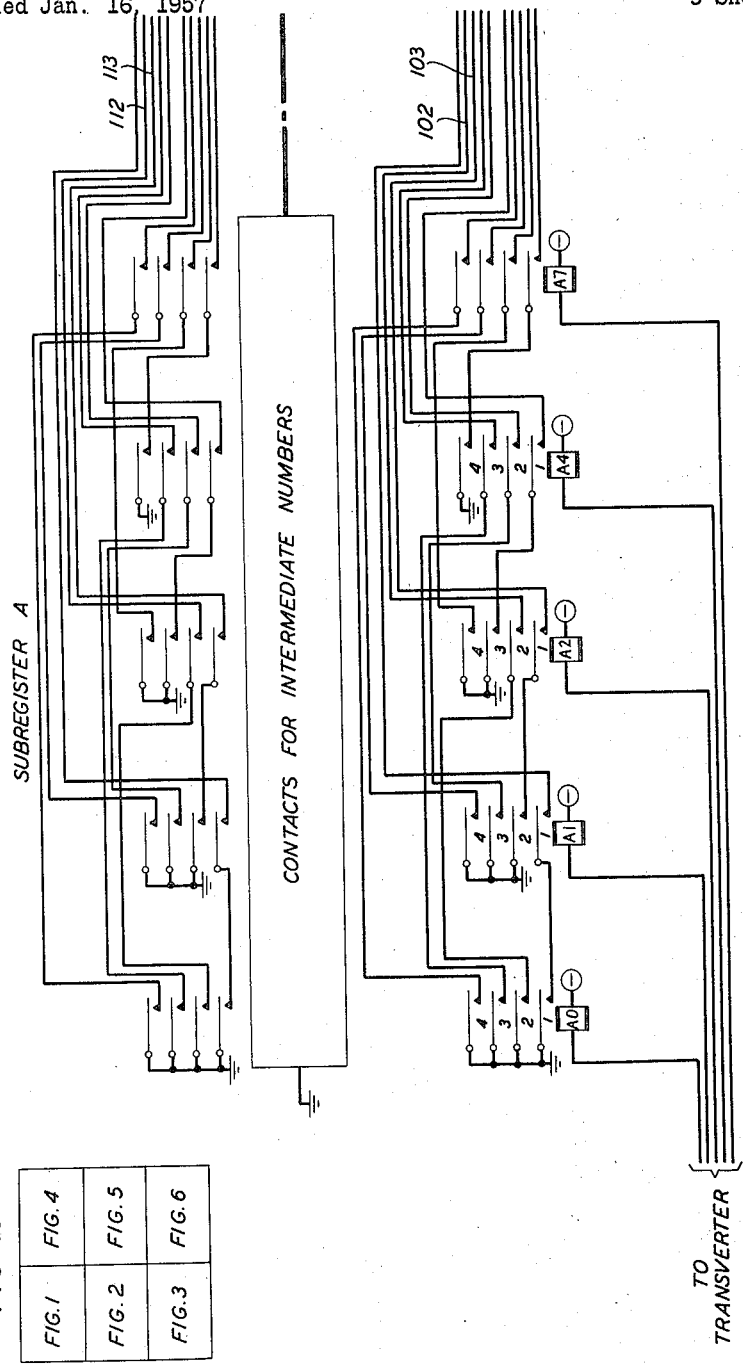
Figs. 1 to 6 show one embodiment of the invention, Figs. 1 to 3 showing the subregisters of the auxiliary register and Figs. 4 to 6 showing the units of a plurality of preset registers.

While the invention has been discussed for use with a telephone system, it will be obvious that it is not limited to such use but would be of service wherever a random multidigit number is to be matched against a plurality of predetermined multidigit numbers. Similarly, the preset switches need not be manually operable but might be set by remote control.

As set forth in the above-identified Breed et al. application, where calls are to be completed through a tandem office of the type disclosed in that application, the called line designation is registered at the local office where the office code portion of the called designation is used to establish a connection between the local office and a tandem office over an interoffice trunk. When this connection has been established, the interoffice trunk is connected with a tandem sender and the called line number is transferred from the local office to the tandem sender, after which the calling line number is also recorded in the tandem sender under the control of an operator at the tandem office. When the equipment at the tandem office has selected an idle trunk outgoing to the office at which the trunk is located, a recorder control device known as a transverter is connected with the sender and the called and calling line number, together with other information, is transferred to the transverter which then proceeds to control the making of what is known as an initial entry for charging purposes. Normally, for calls completed within a limited area, the charge is made in terms of message units and the called line number is not recorded. For calls outside of the limited area, the charge is made in monetary units and the called line number is also recorded.

The transverter is arranged for operation with a number matching circuit, the purpose of which is to provide means for designating at any particular time a predetermined number of subscribers' directory numbers with respect to which detailed information is desired on all calls originated from stations identified by said numbers, for example, because of subscriber complaints relating to charges.

A set of manual digit switches is provided for each directory number to be observed, there being one switch for each digit of the directory number and the number is registered by setting each switch with the corresponding digit of the designation. While a line is extended to the tandem office for the completion of a call therethrough, the transverter operates an auxiliary register in the number matching circuit in accordance with the calling line number. If the number registered on the auxiliary register matches any one of the numbers set up on the preset registers, a match signal is transferred to the transverter which responds to the match signal to produce a complete initial entry whether or not such an entry is required by the nature of the call and to place a mark on the initial entry indicating that the calling line is under observation.

A the same time that the transverter starts to operate the auxiliary register, it initiates a timing operation and, if a match signal is not received prior to the termination of the timing operation, the number matching circuit is dismissed and the transverter completes its operation.

As previously mentioned, applicant's invention is designed to avoid the time delay in permitting the transverter to complete its operation where the calling line number does not match the number of any line on which observation is required.

Figure 2:
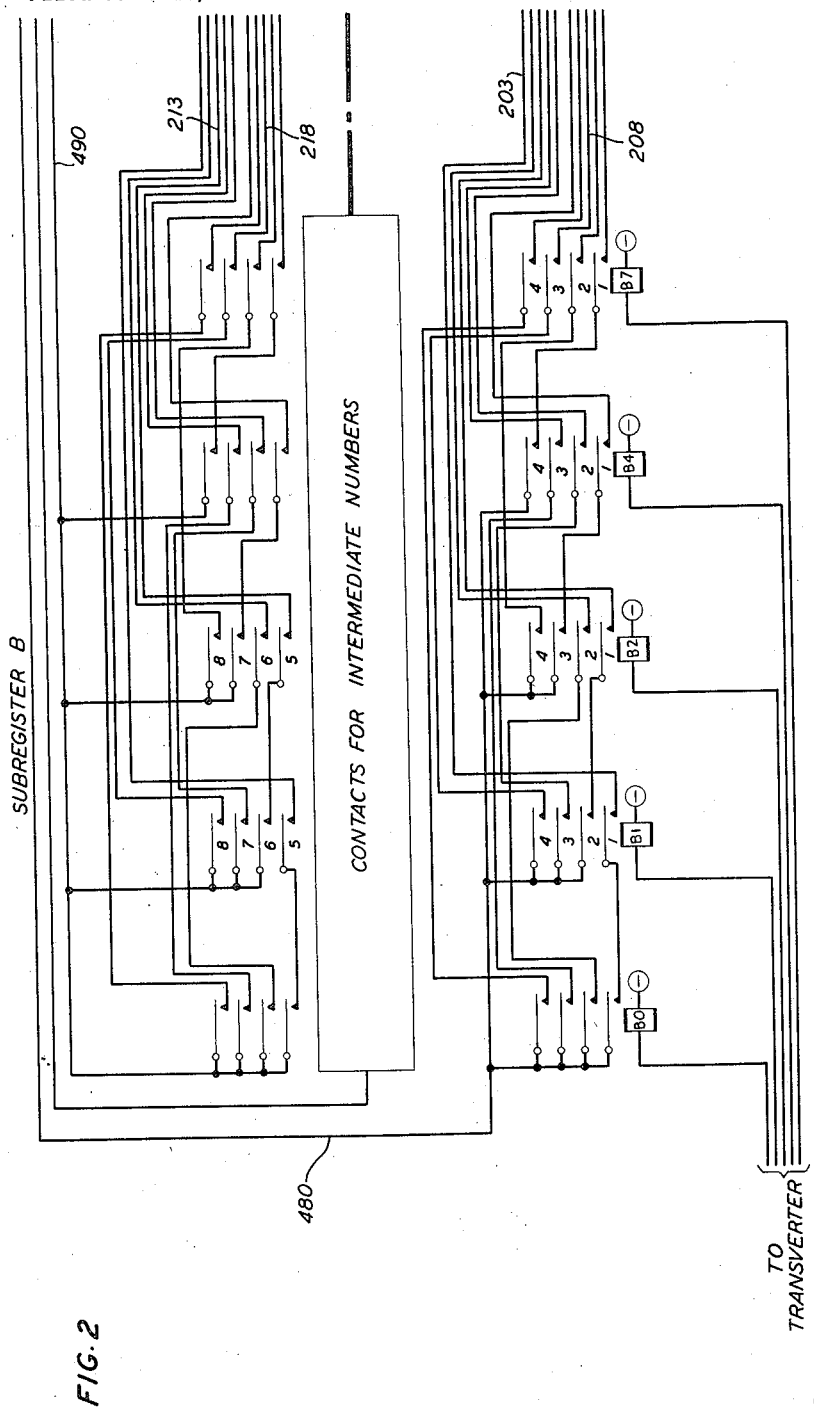
Figure 3:
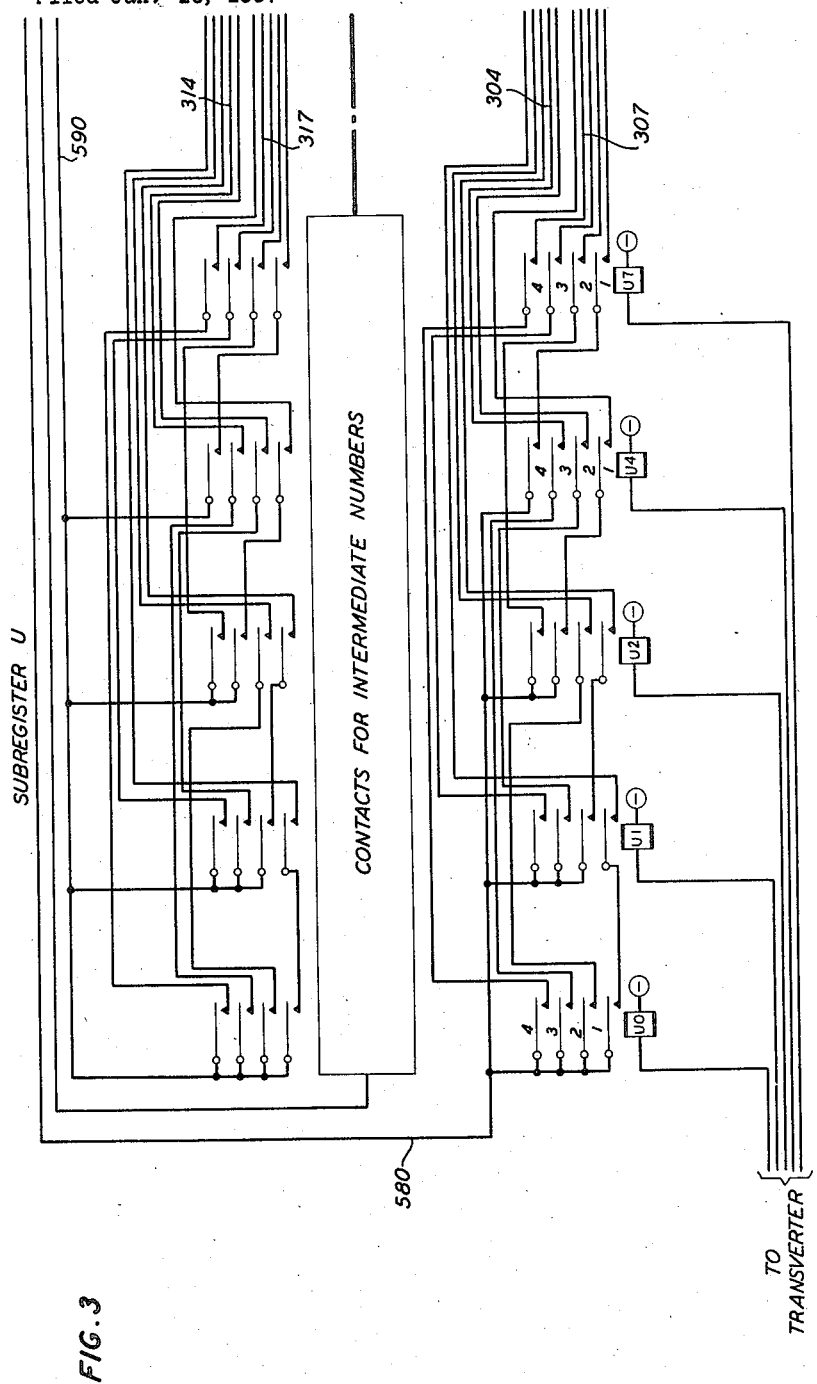

The calling line number register, that is the auxiliary register, shown in Figs. 1, 2, and 3, is essentially the same as that of the Breed et al. application with the exception that the checking circuits have been omitted and contacts have been provided individual to each of the preset registers. The auxiliary register as a whole comprises seven subregisters, one for each of the digits comprising a calling line number. Each subregister consists of five relays which are operated two at a time in accordance with the well-known two-out-of-five code to register the digits 0 to 9 by connecting an input conductor to one of ten output conductors leading to each of the preset registers.

Figure 4:
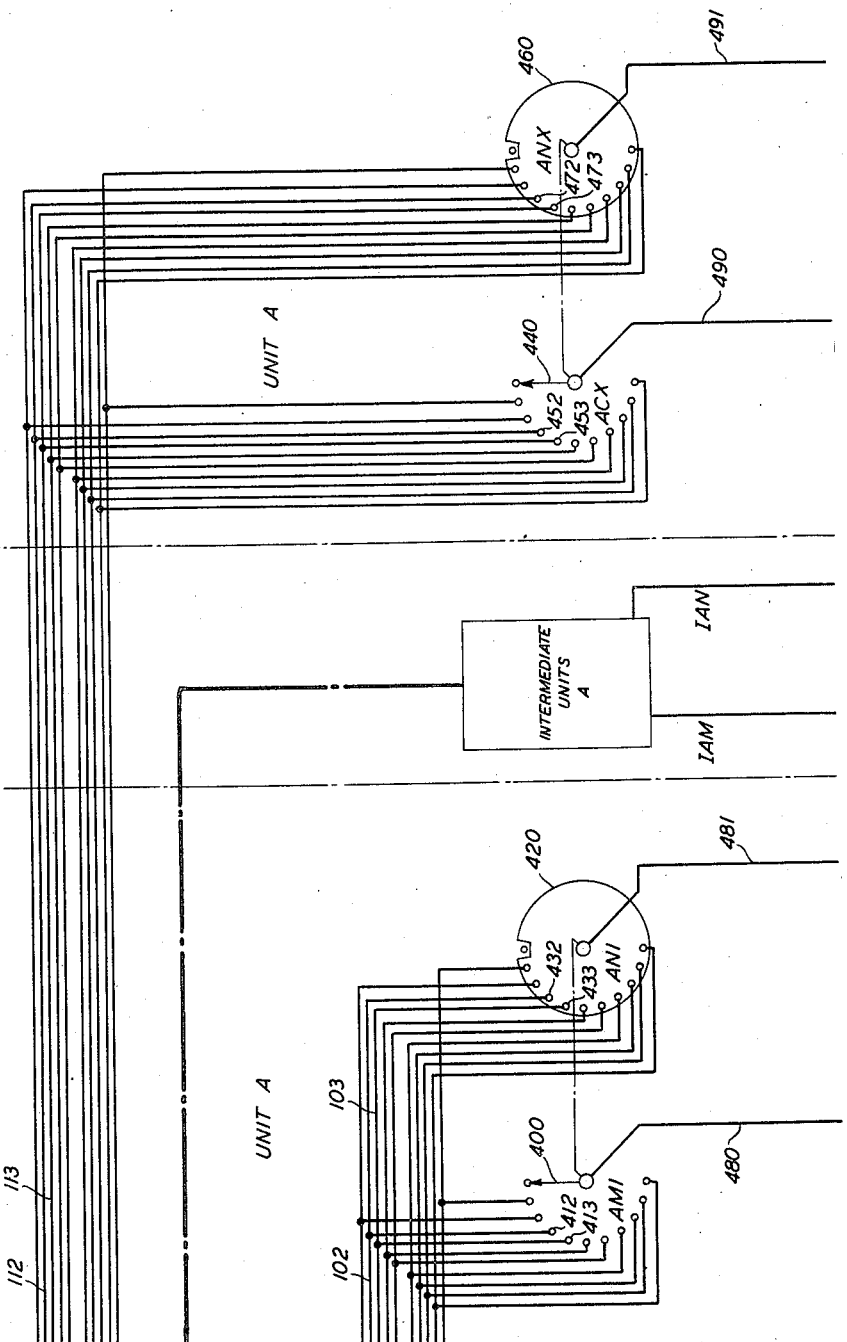
Figure 5:
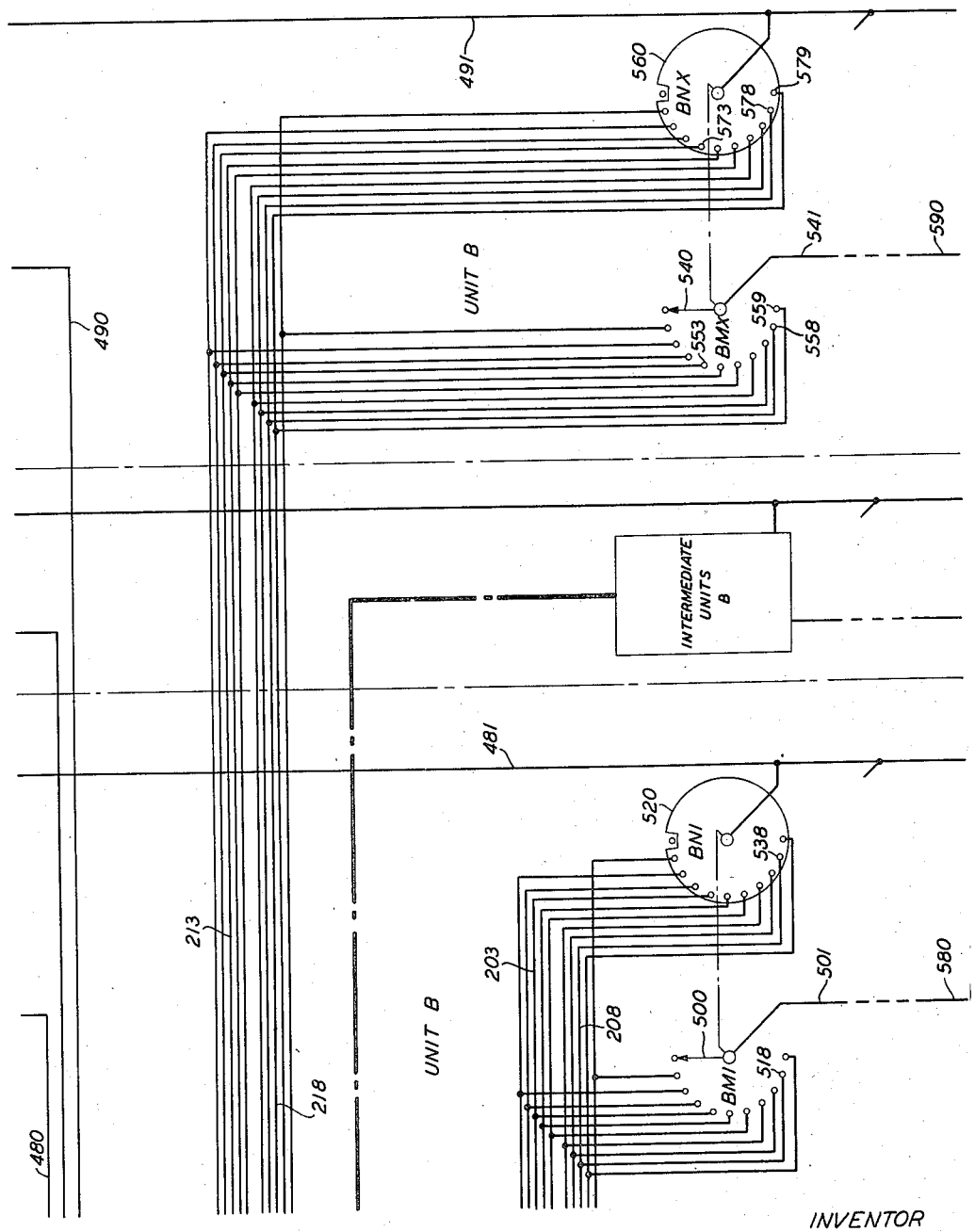
Figure 6:
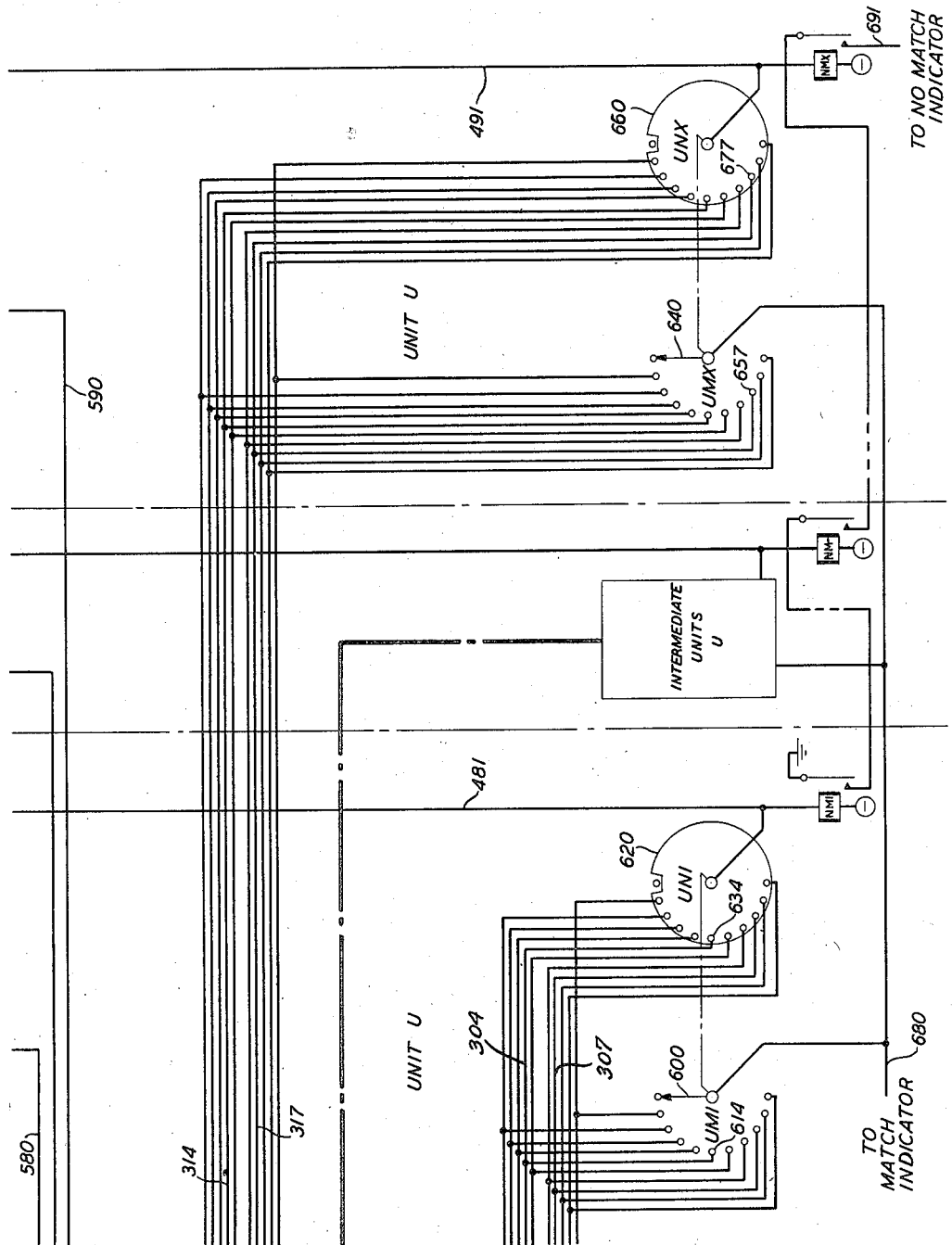

The preset registers shown in Figs. 4, 5, and 6 are preferably made up of a plurality of units, each unit being a manually rotatable switch having two levels and each level having ten contacts corresponding to the ten digits 0 to 9. Each level is provided with a wiper and the two wipers are moved simultaneously by common control. The wiper of one level, which may be called the match level, is a brush which makes contact with one terminal at a time. The wiper of the other level, which may be called the no-match level, is a disc so formed that it makes contact with all of the terminals of the level except the terminal corresponding to the terminal engaged by the brush of the first level in any set position. For example, if the switch is set so that the brush of the first level is marking terminal 1, the disc wiper of the second level will mark terminals 2 to 9 and 0. Each preset register comprises seven settable units, one for each digit of a telephone designation. As many preset registers are provided as the amount of observed traffic requires. Only the first and last of the preset registers are shown, one or more intermediate registers being indicated schematically.

Since the match and no-match circuits for the individual digits are substantially alike, the subregisters and preset units have been shown for three digits, namely those corresponding to the first or A digit, the second or B digit of the office code, and the last or units digit of the calling line number.

To illustrate the functioning of the matching circuit, let it be assumed that the first preset register is set for a line designation AU . . . 4, that the last preset register is set for a line designation EX . . . 7, and that the auxiliary register is set first for the designation AU . . . 4 and then for a designation ED . . . 7. Since the third to sixth units and subregisters have not been shown, it will simplify the description if the very unlikely assumption is made that all these designations have the same digits in the third to sixth places.

According to the above assumption, unit A of the first preset segister will be positioned so that brush 400 engages or marks terminal 412 and the disc 420 exposes terminal 432; unit B of the first preset register will be poistioned so that brush 500 marks terminal 518 and the disc 520 exposes terminal 538; unit U of the first preset register will be positioned so that brush 600 marks terminal 614 and the disc 620 exposes terminal 634. Similarly, for the last preset register, unit A is positioned so that brush 440 marks terminal 453 and disc 460 exposes terminal 473, brush 540 marks terminal 559, and disc 560 exposes terminal 579, brush 640 marks terminal 657, and disc 660 exposes terminal 677.

For the first assumed calling line number subregister A will be set for the digit 2 so that relays A0 and A2 will be operated according to the two-out-of-five code. Subregister B will be set for the digit 8 so that relays B1 and B7 will be operated. Subregister U will be set for the digit 4 so that relays U0 and U4 will be operated.

With relays A0 and A2 operated, a circuit may be traced from ground over contact 2 of relay A0, contact 2 of relay A2 to conductor 102. A circuit will be closed over the upper set of contacts to conductor 112 and similar circuits will be closed by the contacts for the intermediate numbers.

In subregister B, with relays B1 and B7 operated, a circuit is prepared from conductor 480 over contact 4 of relay B1, contact 3 of relay B7 to conductor 208. A circuit is also prepared from conductor 490 to conductor 218 and similar circuits are prepared by the intermediate contact sets.

In subregister U with relays U0 and U4 operated, a circuit is prepared from conductor 580 over contact 3 of relay U0, contact 3 of relay U4 to conductor 304. A circuit is also prepared from contact 590 over the upper set of contacts to conductor 314 and additional circuits are prepared by the intermediate contact sets.

The conductors outgoing from the subregisters are wired directly to the terminals of the preset register units and therefore the result of operating a subregister is in effect to mark a particular terminal in the corresponding units in each of the preset registers. For example, with subregister A set for the digit 2 terminals 412 and 432 will be marked in unit A of the first preset register, terminals 452 and 472 will be marked in unit A of the last preset register, and corresponding terminals will be marked in the units A of the intermediate preset registers. It will be noted by reference to the drawing that there is a separate marking circuit for each preset register and that the terminal marking circuits extend in parallel to the two levels of the unit.

Under the assumed settings of the auxiliary register and the preset registers, ground is connected to conductor 102 which marks terminals 412 and 432 of unit A of the first preset register. Since terminal 432 is exposed, no circuit is completed over disc 420 but since brush 400 is engaging terminal 412, ground on conductor 102 is extended to conductor 480 and through the lower set of contacts of subregister B to conductor 208 over which terminals 518 and 538 of unit B of the first preset register are marked. Since terminal 538 is exposed, no circuit is completed by way of disc 520; but since brush 500 has marked terminal 518, ground connected as above traced to conductor 208 is extended over brush 500 to conductor 501. Since it was assumed that the third to sixth digits also match, ground on conductor 501 will be extended in a similar manner to conductor 580 and thence over the lower contacts of subregister U to conductor 304. Conductor 304 marks terminals 614 and 634 of unit U of the first preset register as before. Since terminal 634 is exposed, no circuit is completed over disc 620, but since brush 600 is engaging terminal 614, ground is connected to match conductor 680 to operate the match indicator of the transverter to indicate that the calling line number matches one of the preset numbers.

In the last preset register, conductor 112 marks terminals 452 and 472 of unit A. Since brush 440 marks terminal 453, no circuit will be completed over brush 440 but since terminal 472 is engaged by disc 460, a circuit would be extended from ground on conductor 112 over disc 460 to conductor 491 to operate the no-match relay NMX individual to the last preset register. Since ground is not extended over brush 440 to conductor 490, the matching circuits for the remaining units of the last preset register are inactive.

For the second calling line number assumed, namely ED . . . 7, relays A1 and A2 will be operated in subregister A, relays B1 and B2 will be operated in subregister B and relays U0 and U7 will be operated in subregister U resulting in the connection of ground to conductors 103, 113, 203, 213, 307, 317, etc.

In unit A of the first present register, conductor 103 will mark terminals 413 and 433. Since brush 400 is marking terminal 412, no circuit will be extended to conductor 480 but a circuit will be extended over disc 420, conductor 481 to battery through the winding of no-match relay NM1 individual to the first preset register.

In unit A of the last preset register, conductor 113 is marking terminals 453 and 473. Since terminal 473 is exposed, no circuit will be completed over disc 460; but since brush 440 is marking terminal 453, ground will be extended over brush 440 to conductor 490. With relays B1 and B2 operated in subregister B, conductor 490 is extended over contact 6 of relay B1, contact 5 of relay B2 to conductor 213 thereby marking terminals 553 and 573 of unit B of the last preset register. With brush 540 marking terminal 559, no circuit is completed over brush 540, but a circuit is closed over disc 560 to conductor 491 to operate no-match relay NMX. Assuming that some one digit of the calling line number also fails to match in each of the preset registers, the no-match relay NM– associated with each of the intermediate preset registers will be operated and a circuit will be completed from ground over the front contact of relay NM1, front contacts of the intermediate relays NM–, front contact of relay NMX to no-match conductor 691 to operate the no-match indicator in the transverter so that the transverter may proceed with the completion of the call.

From the above description it will be apparent that for each preset register, as soon as one digit is found not to match, the corresponding no-match relay is operated and no attempt is made to determine whether or not any of the other digits match.

Figs. 7 and 8 show a different embodiment of the invention as applied to a single subregister and a single preset unit. There will, of course, be a subregister and a unit for each digit of a telephone designation and they will be arranged substantially as shown in Figs. 1 to 6. The relays 0 to 7 of Fig. 7 are operated to register a digit in accordance with the two-out-of-five code as previously described. Each relay has two sets of contacts, namely contacts 1 to 4, over which circuits are completed for the match indicator and contacts 5 to 10 over which circuits are closed for the no-match indicator.

The unit of the preset register comprises a two-level switch, each level having ten terminals but in this case the terminals of both levels are wiped by a brush which makes contact with or marks one terminal at a time.

The arrangement of the number matching circuits is the same as shown in Figs. 1 to 6, the ground for the matching circuits being supplied directly to the subregister for the first digit and over the match circuits of previous digits to the remaining subregisters.

To facilitate an understanding of the no-match circuits of the present embodiment, the following table illustrates the relation between the registers and the circuits by which the corresponding terminal of the first preset register is marked by the absence of ground. In the table only the units digit of the conductors 711 to 710 which connect the auxiliary register with the no-match level have been shown.

| Digit Reg'd in Subreg. | Relays Operated | Conductors Grounded by Each Relay | Conductors Not Grounded by Each Relay | Terminal Not Grounded |
|---|---|---|---|---|
| 0 | 4 | 1,2,3,7,8,9 | 4,5,6,0 | 830 |
|   | 7 | 1,2,3,4,5,6 | 7,8,9,0 |   |
| 1 | 0 | 3,5,6,8,9,0 | 1,2,4,7 | 831 |
|   | 1 | 2,4,6,7,9,0 | 1,3,5,8 |   |
| 2 | 0 | 3,5,6,8,9,0 | 1,2,4,7 | 832 |
|   | 2 | 1,4,5,7,8,0 | 2,3,6,9 |   |
| 3 | 1 | 2,4,6,7,9,0 | 1,3,5,8 | 833 |
|   | 2 | 1,4,5,7,8,0 | 2,3,6,9 |   |
| 4 | 0 | 3,5,6,8,9,0 | 1,2,4,7 | 834 |
|   | 4 | 1,2,3,7,8,9 | 4,5,6,0 |   |
| 5 | 1 | 2,4,6,7,9,0 | 1,3,5,8 | 835 |
|   | 4 | 1,2,3,7,8,9 | 4,5,6,0 |   |
| 6 | 2 | 1,4,5,7,8,0 | 2,3,6,9 | 836 |
|   | 4 | 1,2,3,7,8,9 | 4,5,6,0 |   |
| 7 | 0 | 3,5,6,8,9,0 | 1,2,4,7 | 837 |
|   | 7 | 1,2,3,4,5,6 | 7,8,9,0 |   |
| 8 | 1 | 2,4,6,7,9,0 | 1,3,5,8 | 838 |
|   | 7 | 1,2,3,4,5,6 | 7,8,9,0 |   |
| 9 | 2 | 1,4,5,7,8,0 | 2,3,6,9 | 839 |
|   | 7 | 1,2,3,4,5,6 | 7,8,9,0 |   |

From an examination of the above table, it will be seen that each relay is operated during the registration of four digits, for example, relay 0 is operated when the digits 1, 2, 4, and 7 are registered. Each relay, when operated, grounds conductors numbered to correspond with the digits for which the relay will not be operated. As indicated in Fig. 7, relay 0 grounds conductors 713, 715, 716, 718, 719, and 710 and leaves ungrounded the conductors numbered to correspond with the digits for which the relay is operated, namely conductors 711, 712, 714, and 717. Since two relays are operated, in registering each digit a different set of conductors will be grounded by each relay and the one conductor left ungrounded will be that numbered to correspond with the digit represented by the two operated relays.

Both the match and the no-match conductors outgoing from the subregister are connected in multiple to the terminals of the corresponding units of the preset registers. Assuming that the digit 9 is registered on the subregister of Fig. 7, thereby operating relays 2 and 7 and that the first number register is present for the digit 9 while the last register is preset for the digit 8, ground will be connected over contact 4 of relay 2 and contact 2 of relay 7 to conductor 709 which extends to terminals 819 and 859. From terminal 819 a circuit extends over brush 800 to the winding of match relay M1 while over terminal 859 no circuit is completed since brush 840 is engaging terminal 858. As described for Figs. 1 to 3, the matching circuit will be extended to the next subregister to determine whether the next digit matches.

With relay 2 operated, ground is connected to conductors 711, 714, 715, 717, 718, and 710 and with relay 7 operated, ground is connected to conductors 711, 712, 713, 714, 715, and 716. Since none of these conductors extends to terminal 839, no circuit is closed for the no-match relay NM1. Although relay NM1 is not operated over brush 820, if a no-match condition exists at any other unit of the first preset register, relay NM1 will be operated in a parallel circuit completed from that other register. In the last preset register since brush 860 is engaging terminal 878, ground connected to conductor 718 by relay 2 will complete a circuit over terminal 878, brush 860, rectifier 861, to battery through the winding of no-match relay NMX. As in the case of Figs. 4 to 6, if all of the no-match relays are operated, a circuit is completed over no-match conductor 891 to operate the no-match indicator in the transverter so that the transverter may proceed to make a normal record of the call.

Fig. 9 shows a modification of the arrangement of Figs. 1 to 6. The contact arrangements of the auxiliary subregisters are merely indicated, each contact set being the same as shown in Fig. 1, for example, and are wired to the terminals of the preset register units in the manner shown in Fig. 4, for example. Ground is supplied only to the contact set for the first number associated with the subregister for the digit A. The output conductors from this contact set are wired in multiple to the two terminal sets of unit A in the first preset register. The brush of the matching level of this unit is connected to the contact set of the same number in the subregister for the digit B while the discs of all units belonging to the first preset register are connected in multiple to the contact set for the second number in the digit A subregister.

To illustrate the operation of the arrangement of Fig. 9, let is be assumed as a first example that the number received on the auxiliary register matches the number set up on the first preset register and, as a second example, let it be assumed that the A digit received on the A subregister matches the digits preset on the first two A units, that the B digit received on the B subregister matches the B digit preset on the B unit of the first preset register and that the U digit received on the units subregister matches none of the preset units digits.

Under the first assumption, ground will be extended over the contact set 900 of the A subregister to the terminal engaged by brush 901, thence over conductor 902 through the contact set 903 of the B subregister to the terminal engaged by brush 904 and in a similar manner to the contact set 905 on the digit U subregister, over a circuit closed by these contacts to the terminal engaged by brush 906 and over brush 906 and conductor 907 to the match indicator. This matching arrangement is essentially the same as that shown in Figs. 1 to 6.

Under the second assumption, ground will be extended over contact set 900 of the A subregister to the terminal engaged by brush 901 and thence over conductor 902 to the contact set 903 of the B subregister. The circuit will be further extended to the terminal engaged by brush 904 and thence to the contact set 905 of the units subregister. Since it was assumed that the units digit registered on the units subregister matches none of the preset digits, a circuit will extend from contact set 905 by way of disc 908 to the no-match conductor 909 of the first preset register and thence to contact set 910 individual to the second preset number in the contact arrangement of the A subregister. Since the digit registered on the A subregister matches the digit preset on the A unit of the second preset register, the circuit will further extend over brush 911, conductor 912 to contact set 913 individual to the second number in the B subregister. The output conductors of contact set 913 are connected to the terminals of the B unit of the second preset register. Since the B digit registered on the B subregister does not match the B digit set up on the second preset register, no circuit will be extended over brush 914, but a circuit will be extended over disc 915 and conductor 916 to contact set 917 individual to the last preset register in the contact arrangement of the A subregister. Since the digit registered on the A subregister does not match the digit set up on the A unit of the last preset register, no circuit will be extended over brush 918, but a circuit will be extended over disc 919 to conductor 920 leading to the no-match indicator.

This arrangement has the advantage over the arrangement of Figs. 1 to 6 that each preset number is checked in turn for a matching condition and as soon as a no-match condition is detected, the checking circuit is extended to check the next preset number thereby obviating the necessity of a no-match relay for each preset register.

What is claimed is:

1. A number matching arrangement comprising a plurality of first registers, means for setting said registers in accordance with a plurality of predetermined multidigit numbers, an auxiliary register, means for setting said auxiliary register in accordance with a randomly selected multidigit number, a match indicator, a no-match indicator, means controlled jointly by said auxiliary register and any one of said first registers to operate said match indicator, and means controlled jointly by said auxiliary register and all of said first registers to operate said no-match indicator.

2. A number matching arrangement comprising a plurality of first registers, each register including a plurality of units, means for setting said registers in accordance with a plurality of predetermined multidigit numbers, an auxiliary register including a plurality of subregisters, means for setting said auxiliary register in accordance with a randomly selected multidigit number, a match indicator, a no-match indicator, means controlled jointly by the subregisters of said auxiliary register and by the units of any one of said first registers to operate said match indicator, and means controlled jointly by said auxiliary register and by at least one unit in each of said first registers to operate said no-match indicator.

3. A number matching arrangement comprising a plurality of preset registers for registering a plurality of predetermined multidigit numbers, an auxiliary register, a match indicator and a no-match indicator, a first chain circuit for operating said match indicator and a second chain circuit for operating said no-match indicator, each of said preset registers having a match section and no-match section, means for setting said auxiliary register in accordance with a random multidigit number, means under the joint control of said auxiliary register and the match section of a single preset register for completing the chain circuit for operating said match indicator and under the joint control of said auxiliary register and the no-match sections of all of said preset registers for completing said second chain circuit for operating said no-match indicator.

4. A number matching arrangement comprising a plurality of preset registers for registering a plurality of predetermined multidigit numbers, each of said preset registers including a plurality of units, an auxiliary register, including a plurality of subregisters, a match indicator and a no-match indicator, a first chain circuit for operating said match indicator and a second chain circuit for operating said no-match indicator, each of said preset register units having a match section and a no-match section, means for setting said auxiliary register in accordance with a random multidigit number, means under the joint control of the subregisters of said auxiliary register and the match section of the units of a single preset register for completing the chain circuit for operating said match indicator and means under the joint control of the subregisters of said auxiliary register and the no-match sections of at least one unit of each of said preset registers for completing said second chain circuit for operating said no-match indicator.

5. In a telephone system, means for comparing telephone designations comprising a plurality of first registers, means for setting said registers in accordance with a plurality of predetermined telephone designations, an auxiliary register, means for setting said auxiliary register in accordance with a randomly selected telephone designation, a match indicator, a no-match indicator, means controlled jointly by said auxiliary register and any one of said first registers to operate said match indicator, and means controlled jointly by said auxiliary register and all of said first registers to operate said no-match indicator.

6. In a telephone system, means for comparing telephone designations comprising a plurality of first registers, each of said first registers including a plurality of settable units each unit corresponding to one digit of a telephone designation and having sets of terminals, means to set said units to mark terminals in accordance with the numerical value of the corresponding digit, an auxiliary register including a subregister corresponding to each digit of a telephone designation, means for setting said auxiliary register in accordance with a selected telephone designation, means under the control of each subregister for marking the terminals of the units of said first registers corresponding to the same digit, a match indicator, a no-match indicator, means effective if the same terminals are marked by the subregisters and by all of the units of one first register to operate said match indicator, and means effective if each of said subregisters marks a terminal not marked by one corresponding unit in each of said first registers for operating said no-match indicator.

7. In a telephone system, means for comparing telephone designations comprising a plurality of preset registers for registering a plurality of predetermined telephone designations, each of said preset registers including a plurality of units, an auxiliary register, including a plurality of subregisters, a match indicator and a no-match indicator, a first chain circuit for operating said match indicator and a second chain circuit for operating said no-match indicator, each of said preset register units having a match section and a no-match section, means for setting said auxiliary register in accordance with a random telephone designation, means under the joint control of the subregisters of said auxiliary register and the match section of the units of a single preset register for completing the chain circuit for operating said match indicator and means under the joint control of the subregisters of said auxiliary register and the no-match section of at least one unit in each of said preset registers for completing said second chain circuit for operating said no-match indicator.

References Cited in the file of this patent

UNITED STATES PATENTS 2,297,365     Ostline _____ Sept. 29, 1942